United States Patent
Walton et al.

(10) Patent No.: US 7,821,922 B1
(45) Date of Patent: Oct. 26, 2010

(54) FAULT ISOLATION AND HANDLING IN A PACKET SWITCHING NETWORK

(75) Inventors: John K. Walton, Mendon, MA (US); Kendell Chilton, Southborough, MA (US); James Guyer, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 825 days.

(21) Appl. No.: 11/278,152

(22) Filed: Mar. 31, 2006

(51) Int. Cl.
*G01R 31/08* (2006.01)
*H04L 12/28* (2006.01)
*H04L 1/00* (2006.01)

(52) U.S. Cl. ............... 370/220; 370/225; 370/395.31; 714/746

(58) Field of Classification Search .............. 370/216, 370/225, 351, 389, 400; 714/699, 746, 748, 714/100, 1–5
See application file for complete search history.

(56) References Cited

U.S. PATENT DOCUMENTS

| | | | | |
|---|---|---|---|---|
| 6,487,208 B1 * | 11/2002 | Chirashnya et al. | ......... | 370/400 |
| 6,981,174 B1 * | 12/2005 | Hanning | ......... | 714/5 |
| 7,434,088 B2 * | 10/2008 | Gale et al. | ......... | 714/4 |
| 2003/0231633 A1 * | 12/2003 | Aramizu et al. | ......... | 370/395.31 |
| 2007/0025328 A1 * | 2/2007 | Cohen et al. | ......... | 370/351 |
| 2007/0053283 A1 * | 3/2007 | Bidwell et al. | ......... | 370/216 |

\* cited by examiner

*Primary Examiner*—Ricky Ngo
*Assistant Examiner*—Paul Masur

(57) ABSTRACT

A packet switching network having a plurality of nodes and a network having: a plurality of switches couples to the nodes and links interconnecting ports of the plurality of switches. Each one of the switches has a normal routing table for routing packets from a source one of the nodes to a destination one of the nodes through the network in according to the normal routing table and, for, upon such upon such source one of the nodes detecting a fault in transmission of such packet, routing such to a predetermined designated fault one of the ports of such switch.

12 Claims, 8 Drawing Sheets

FIG. 2  Normal "A" Routing Network

Normal "B" Routing Network

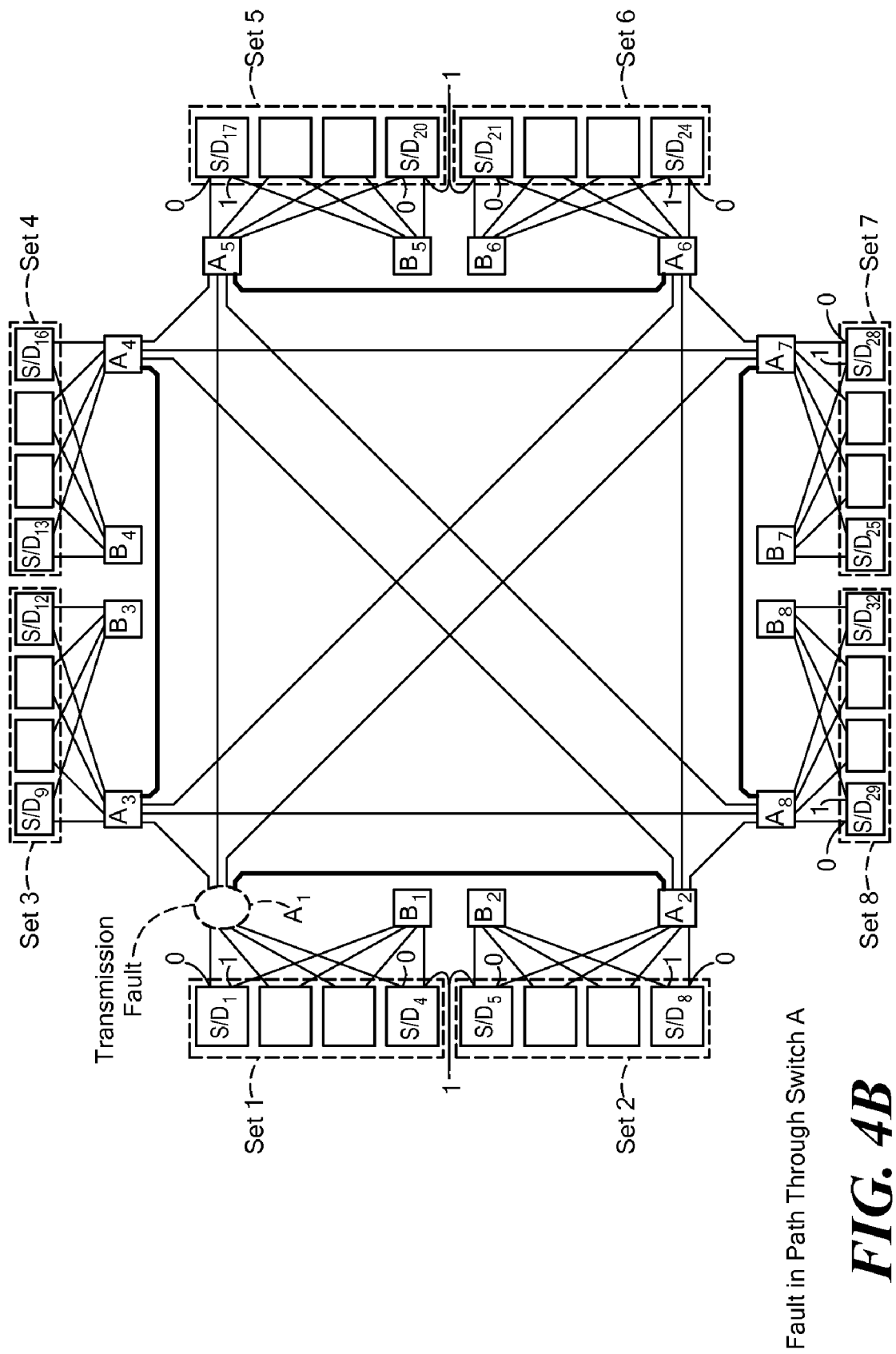
FIG. 4B  Fault in Path Through Switch A

FAULT ISOLATION AND HANDLING IN A PACKET SWITCHING NETWORK

TECHNICAL FIELD

This invention relates generally to switching networks and more particularly to packet switching networks.

BACKGROUND

As is known in the art, most non-trivial packet switched networks require switch based lookup routing tables to properly route a packet in the fault free case. However, when a fault; such as a link failure has occurred, some fabric management (including management redundancy) must isolate the fault, and reprogram the appropriate tables to route traffic around the failed link, or switch.

SUMMARY

In accordance with eth present invention, a packet switching network is provided having a plurality of nodes and a network having: a plurality of switches couples to the nodes and links interconnecting the ports of the plurality of switches. Each one of the switches has a normal routing table for routing packets from a source one of the nodes to a destination one of the nodes through the network in according to the normal routing table upon such source one of the nodes detecting a fault in transmission of such packet, routing such packet to a predetermined designated fault one of the ports of such switch.

In one embodiment, a first portion of the plurality of switches are interconnected through a first portion of the links to provide a first portion of the network and a second portion of the plurality of switches are interconnected through a second portion of the links to provide a second portion of the network. The plurality of nodes is arranged in sets, each one of the nodes having a pair of ports. Each one of the sets of nodes is coupled to a corresponding one of the first portion of the switches and to a corresponding one of the second portion of the switches. A first one of the pair of nodes in each one of the sets thereof is connected to the corresponding one of the switches of the first portion of switches and a second one of the pair of nodes in each one of the sets thereof is connected to the corresponding one of the switches of the second portion of switches.

In one embodiment, each one of the nodes directs the packet to the first one of the pair of ports thereof providing a most direct route to the destination one of the nodes.

In one embodiment, each one of the nodes directs the packet to the second one of the pair of ports thereof upon such one of the nodes detecting a fault in the transmission of such packet to the destination one of the nodes.

With such a network, a simple bi-furcated fully connected mesh fault tolerant packet switching network is provided having simple hardware based reconfiguration heuristic. When an Acknowledgement (ACK) has missed the timeout window over the primary link topology thereby indicating a fault in the packet transmission, a simple heuristic implemented in the switch, and fabric topology re-routes the packet over the secondary fabric to the intended destination without modification of the packet. This makes hardware retry of end-to-end acknowledgment systems extremely simple. A simple hardware heuristic is less prone to failing to fix the problem due to much reduced complexity.

The network is a bi-furcated fully connected mesh allowing with redundant failure bypass links to allow for switch, and link failures that a simple switch based heuristic can use to recover for any single fault. This eliminates the need for complicated redundant fault isolation management software to reconfigure the system on the first failure. Additional instances of the identical topology can be overlaid with the first to further add fault resiliency.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4A is a flow diagram of a process performed within nodes of the set of nodes of FIG. 4A detecting a fault in transmission of a packet there from;

FIG. 4B is a diagram of the A network illustrating a fault in transmission for an exemplary one of the nodes in a set of such nodes.

Like reference symbols in the various drawings indicate like elements.

DETAILED DESCRIPTION

Figure 1:
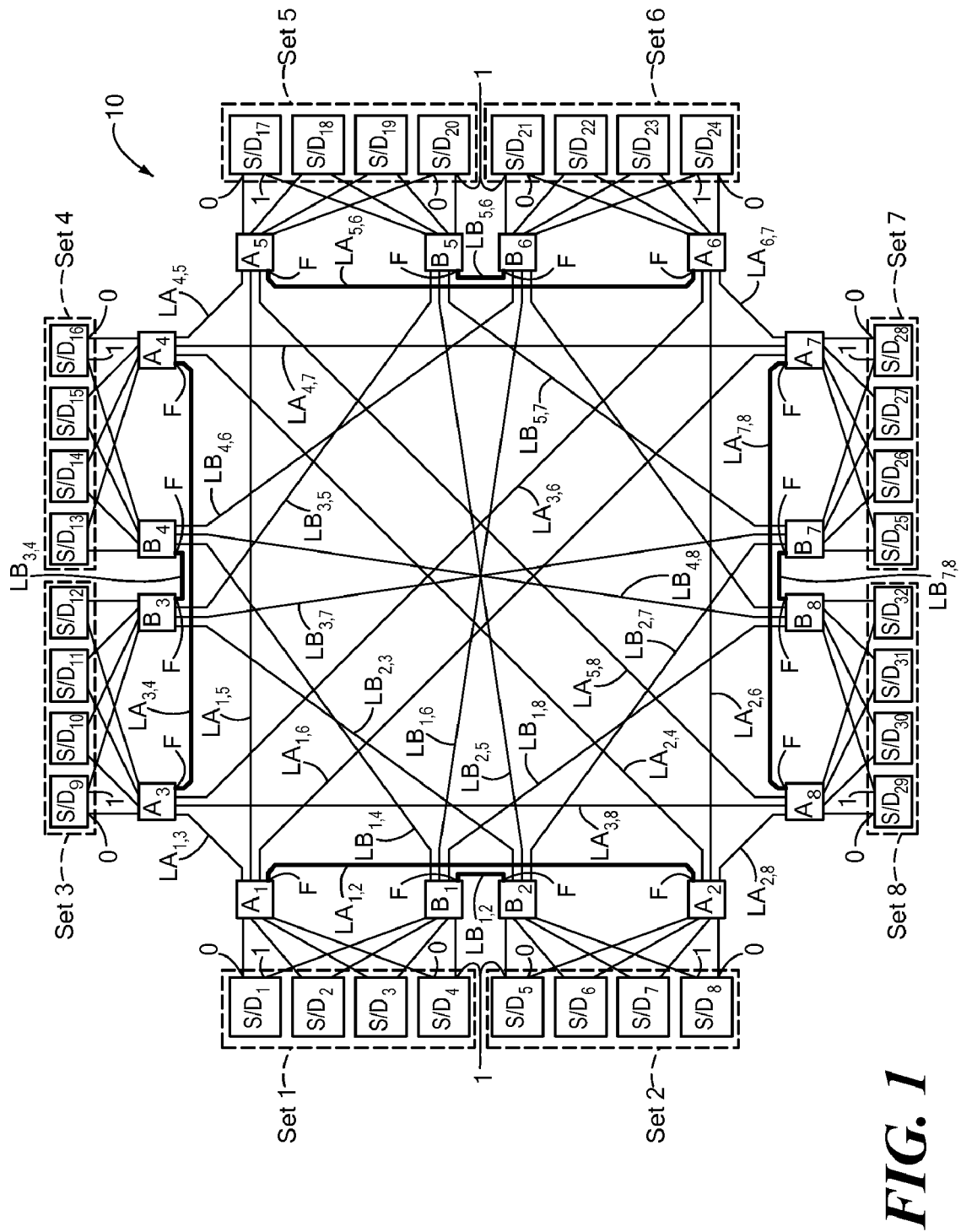
FIG. 1 is a block diagram of a packet switching network according to the inventions.

Referring now to FIG. 1, a packet switching network 10 has a plurality of Source (S)/Destination (D) nodes, here 32 nodes S/D1 through S/D32. The network 10 includes a plurality of switches A1-A8 and B1-B8 couples to the nodes S/D1 through S/D 32 and links LAx,y and LBx,y interconnecting the plurality of switches A1-A8 and B1-B8, where x, and y are integers designating the pair of switches connected by the link. For example, link LA1,3 is the link between switch A1 and switch A3 while link LB6,8 is the link between switch B6 and B8, and so forth, as indicated in FIG. 1.

Each one of the switches A1-A8 and B1-B8 has a normal routing table, described below in TABLE 1, for routing packets from a source one of the nodes S/D1 through S/D32 to a destination one of the nodes S/D1 through S/D32 through the network 10 in according to the normal routing table (Table 1). As will be described, a fault routing table need not be included but merely logic that indicated that if an destination is absent from the routing table for the switch, such packet is routed to a fault port (F) for such switch. Thus, upon such source one of the nodes detecting a fault in transmission of such packet, packets are thereby routed through the through the network in accordance with the fault routing table (Table 2).

Figure 2:
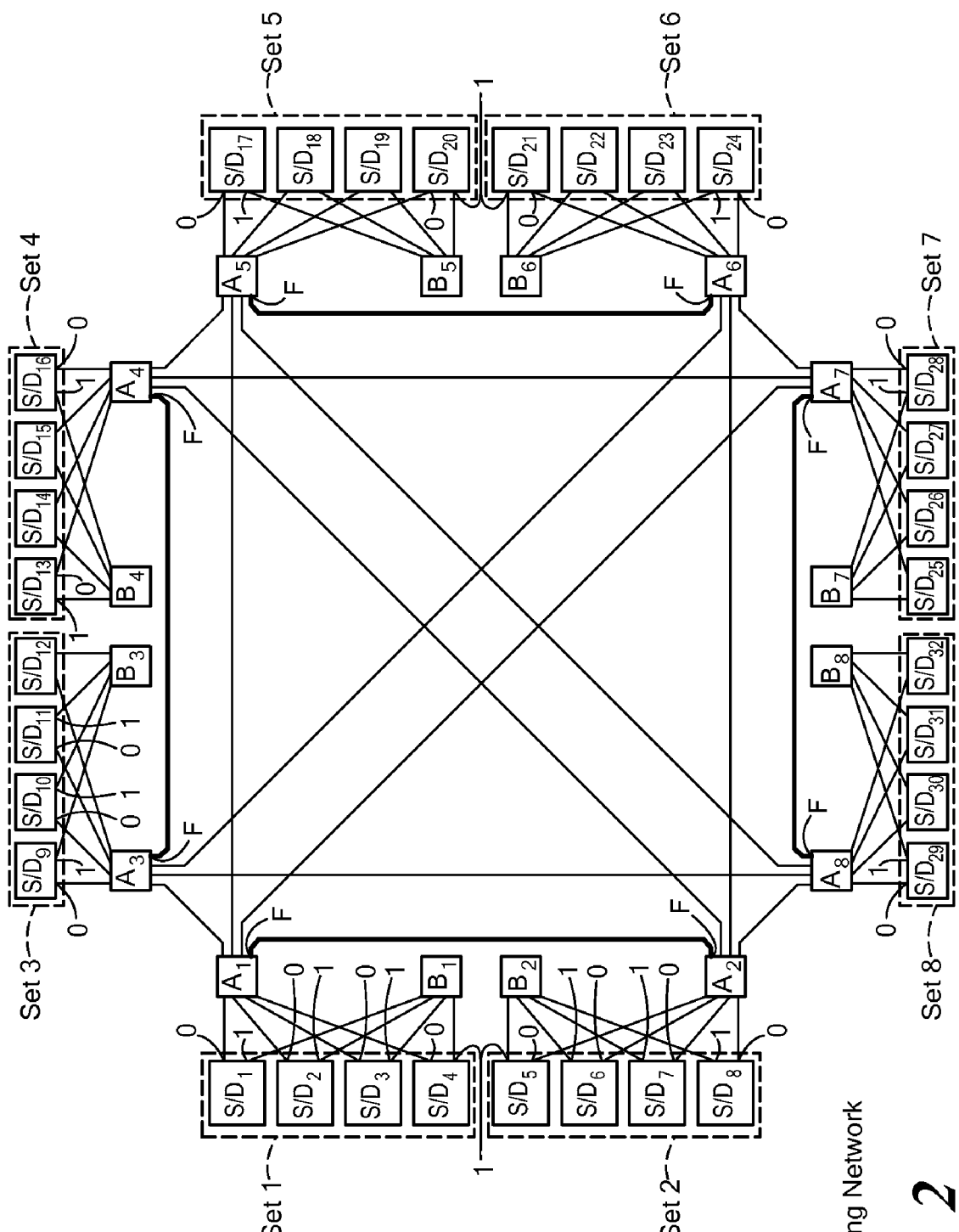
FIG. 2 is a block diagram of a portion of the packet switching network, such portion comprising an "A" network.
Figure 3:
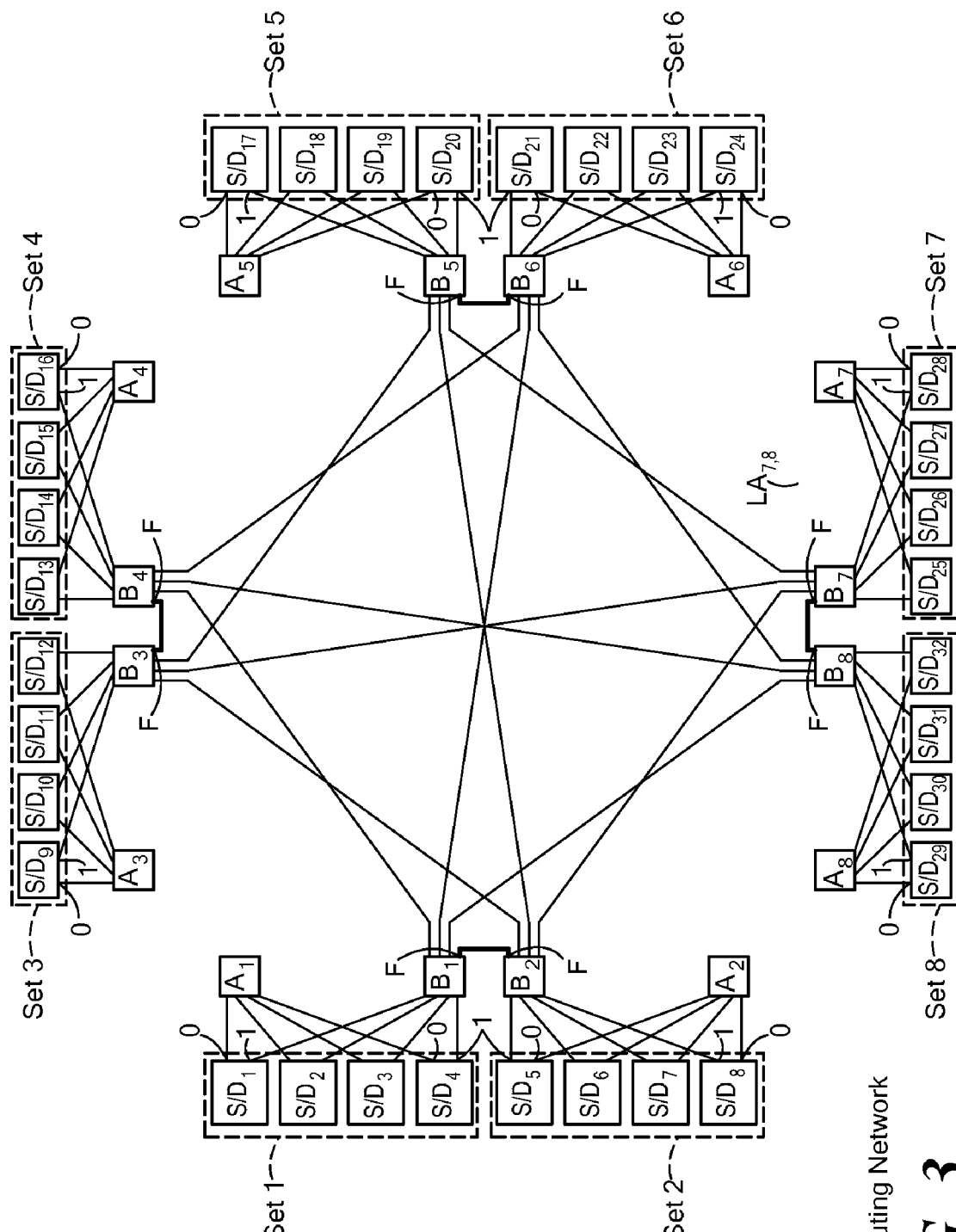
FIG. 3 is a block diagram of a portion of the packet switching network, such portion comprising a "B" network.

A first portion of the plurality of switches, here switches A1, A2, A3, A4, A5, A6, A7 and A8, are interconnected through a first portion of the links to provide a first portion of the network, herein sometimes referred to as the A network and a second portion of the plurality of switches, here switches B1, B2, B3, B4, B5, B6, B7 and B8, are interconnected through a second portion of the links to provide a second portion of the network herein sometimes referred to as the B network. Thus, the network 10 may be considered as a bi-furcated network made up of the A network, shown in FIG. 2, and the B network, shown in FIG. 3.

The plurality of nodes S/D1 through S/D32 is arranged in sets, here 8 sets designated as SET 1 through SET 8. Each one of the nodes S/D1 through S/D32 has a pair of ports, a first one being designated as port 0 and the second one being designated as port 1. Each one of the sets of nodes SET 1 through SET 8 is coupled to a corresponding one of the first portion of the switches A1, A2, A3, A4, A5, A6, A7 and A8, and to a corresponding one of the second portion of the switches B1, B2, B3, B4, B5, B6, B7 and B8. A first one of the pair of nodes in each one of the sets thereof is connected to the corresponding one of the switches of the first portion of switches and a second one of the pair of nodes in each one of the sets thereof is connected to the corresponding one of the switches of the second portion of switches. Thus, the ports 0 are connected to switches A1, A2, A3, A4, A5, A6, A7 and A8 and the ports 1 are connected to the switches B1, B2, B3, B4, B5, B6, B7 and B8. For example, considering the nodes S/D1 through S/D4 in SET 1, the ports 0 of such nodes S/D1 through S/D4 are connected to switch A1 and the ports 0 of such nodes S/D1 through S/D4 are connected to switch B1. Likewise, for the nodes S/D5 through S/D8 in SET 2, the ports 0 of such nodes S/D5 through S/D8 are connected to switch A2 and the ports 0 of such nodes S/D5 through S/D8 are connected to switch B2, and so forth so that for the nodes S/D29 through S/D32 in SET 8, the ports 0 of such nodes S/D29 through S/D32 are connected to switch A8 and the ports 0 of such nodes S/D29 through S/D32 are connected to switch B8

Each one of the nodes S/D1 through S/D32 directs the packet to the first one of the pair of ports thereof providing a most direct route (i.e., a route having the fewest number of switches) to the destination one of the nodes. Here, the most direct routes have only two switches between the source node and the destination node.

Figure 4:
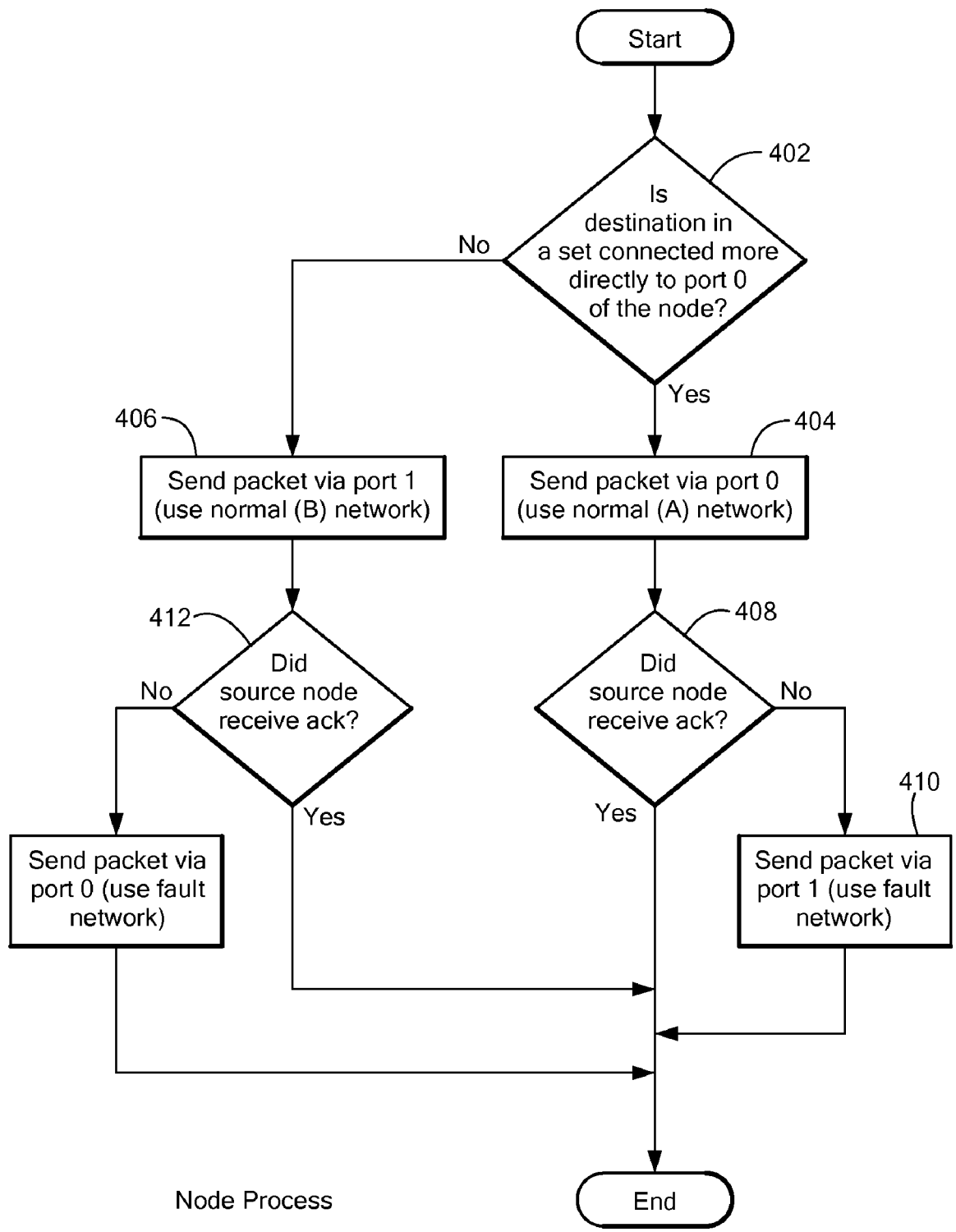
FIG. 4 is a flow diagram of a process performed within nodes of the network of FIG. 1.

Each one of the nodes directs the packet to the second one of the pair of ports thereof upon such one of the nodes detecting a fault in the transmission of such packet to the destination one of the nodes. More particularly, referring also FIG. 4, the node examines the destination field of the packet to be transmitted and determines whether the destination node is in a set connected more directly to port 0 of such node, Step 402. If it is, the node directs the packet to port 0, Step 404; otherwise it directs the packet to port 1, Step 406. If the packet is directed to port 0, as in Step 404, the node detects whether there is an acknowledgement (ACK) from the destination node within a predetermined period of time from transmission. Step 408. If there is the transmission is complete; on the other hand, if the ACK is not received within the predetermined period of time thereby indicating to the source node that there was a fault in the transmission, the source node retransmits the packet to port 1, Step 410. Likewise, if the source node sent the packet to its port 1 in Step 406 and an ACK is received by the source node within a predetermined period of time, Step 412, the process ends; otherwise, the node sends the packet to its port 0 (Step 412).

For example, considering a source node in SET 1:

NODE EQUATION (for SET1)

Figure 4A:
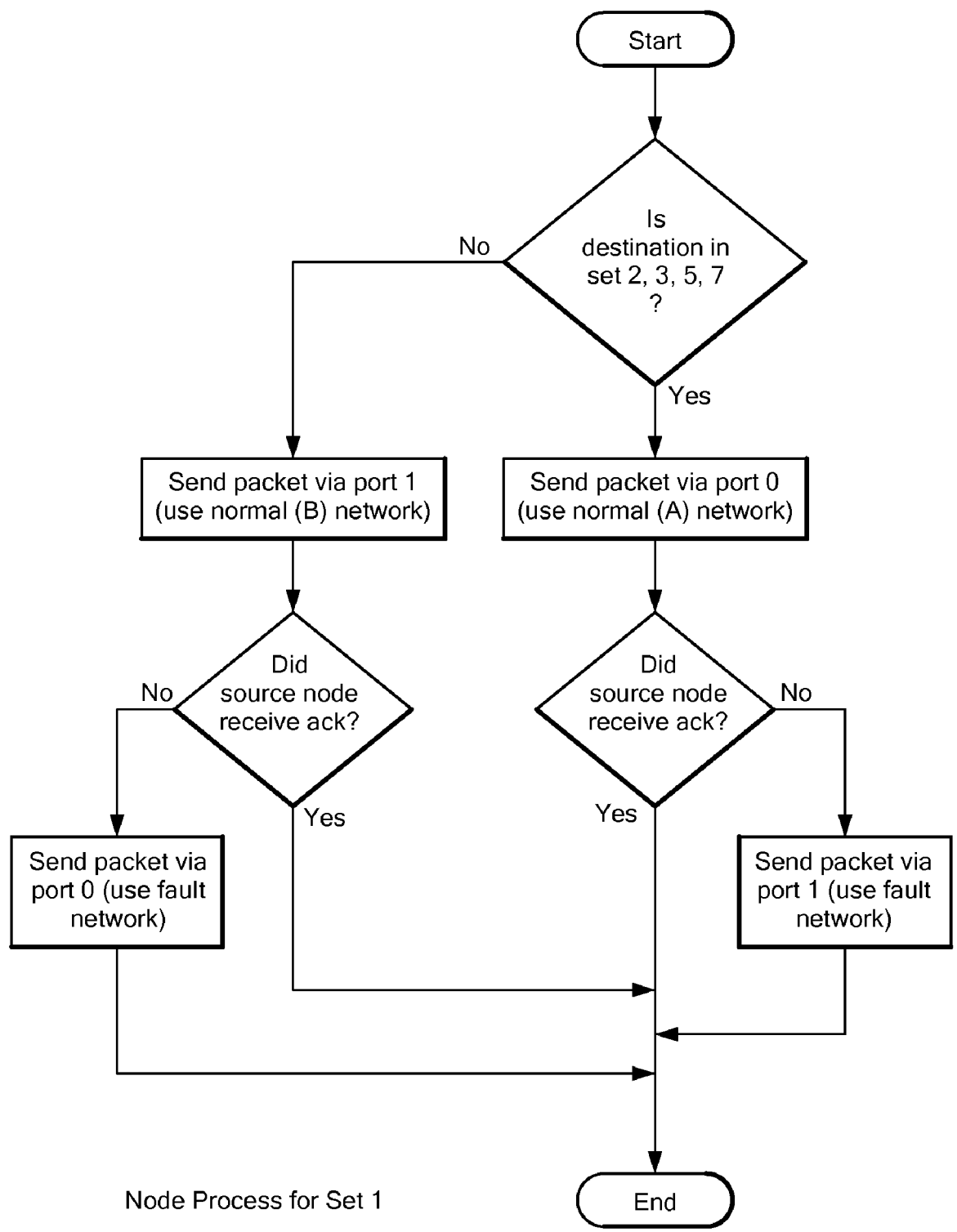

IF (the node is in SET {3,5,7,2})
 Begin
  The packet is sent to the 0 port
  If (the packet gets an ACK)
   The packet is sent OK
  ELSE
   The packet is sent to the 1 port
 End
ELSE
 Begin
  IF (the node is in the SET {4,6,8,2}
  Begin
   The packet is sent to the 1 port
   If (the packet gets an ACK)
    The packet is sent OK
   Else
    The packet is sent to the 0 port
  End
 End The flow diagram for this example is shown in FIG. 4A.

As noted above, each switch S/D1 through S/D32 has a normal routing table that has an entry for every destination (receiver address) connected to it. It also has one 'default' entry (i.e., herein refereed to as a fault table) for any receiver address that is not connected to it.

The normal routing tables for the switches are in TABLE 1 below:

TABLE 1

| SET HAVING DESTINATION NODE IN | ROUTE TO SWITCH |
|---|---|
| NORMAL ROUTING TABLE SWITCH A1 | |
| SET 1 | A1 |
| SET 2 | A2 |
| SET 3 | A3 |
| SET 5 | A5 |
| SET 7 | A7 |
| NORMAL ROUTING TABLE SWITCH A2 | |
| SET 1 | A1 |
| SET 2 | A2 |
| SET 4 | A4 |
| SET 6 | A6 |
| SET 8 | A8 |
| NORMAL ROUTING TABLE SWITCH A3 | |
| SET 1 | A1 |
| SET 3 | A3 |
| SET 4 | A4 |
| SET 6 | A6 |
| SET 8 | A8 |
| NORMAL ROUTING TABLE SWITCH A4 | |
| SET 2 | A2 |
| SET 3 | A3 |
| SET 4 | A4 |
| SET 5 | A5 |
| SET 7 | A7 |
| NORMAL ROUTING TABLE SWITCH A5 | |
| SET 1 | A1 |
| SET 2 | A2 |
| SET 4 | A4 |
| SET 5 | A5 |
| SET 6 | A6 |
| NORMAL ROUTING TABLE SWITCH A6 | |
| SET 2 | A2 |
| SET 3 | A3 |
| SET 5 | A5 |
| SET 6 | A6 |
| SET 7 | A7 |
| NORMAL ROUTING TABLE SWITCH A7 | |
| SET 1 | A1 |
| SET 4 | A4 |
| SET 6 | A6 |
| SET 7 | A7 |
| SET 8 | A8 |
| NORMAL ROUTING TABLE SWITCH A8 | |
| SET 2 | A2 |
| SET 3 | A3 |

TABLE 1-continued

| SET HAVING DESTINATION NODE IN | ROUTE TO SWITCH |
|---|---|
| SET 5 | A5 |
| SET 7 | A7 |
| SET 8 | A8 |
| NORMAL ROUTING TABLE SWITCH B1 | |
| SET 1 | B1 |
| SET 2 | B2 |
| SET 4 | B4 |
| SET 6 | B6 |
| SET 8 | B8 |
| NORMAL ROUTING TABLE SWITCH B2 | |
| SET 1 | B1 |
| SET 2 | B2 |
| SET 3 | B3 |
| SET 5 | B5 |
| SET 7 | B7 |
| NORMAL ROUTING TABLE SWITCH B3 | |
| SET 2 | B1 |
| SET 3 | B3 |
| SET 4 | B4 |
| SET 5 | B5 |
| SET 7 | B7 |
| NORMAL ROUTING TABLE SWITCH B4 | |
| SET 1 | B1 |
| SET 3 | B3 |
| SET 4 | B4 |
| SET 6 | B6 |
| SET 8 | B8 |
| NORMAL ROUTING TABLE SWITCH B5 | |
| SET 2 | B2 |
| SET 3 | B3 |
| SET 5 | B5 |
| SET 6 | B6 |
| SET 7 | B7 |
| NORMAL ROUTING TABLE SWITCH B6 | |
| SET 1 | B1 |
| SET 4 | B4 |
| SET 5 | B5 |
| SET 6 | B6 |
| SET 8 | B8 |
| NORMAL ROUTING TABLE SWITCH B7 | |
| SET 2 | B2 |
| SET 3 | B3 |
| SET 5 | B5 |
| SET 7 | B7 |
| SET 8 | B8 |
| NORMAL ROUTING TABLE SWITCH B8 | |
| SET 1 | B1 |
| SET 4 | B4 |
| SET 6 | B6 |
| SET 7 | B7 |
| SET 8 | B8 |

If a fault in transmission is detected in a node, the node changes the transmission from port having the most the direct route to the destination to the other one of the pair of ports of such source node.

Figure 5:
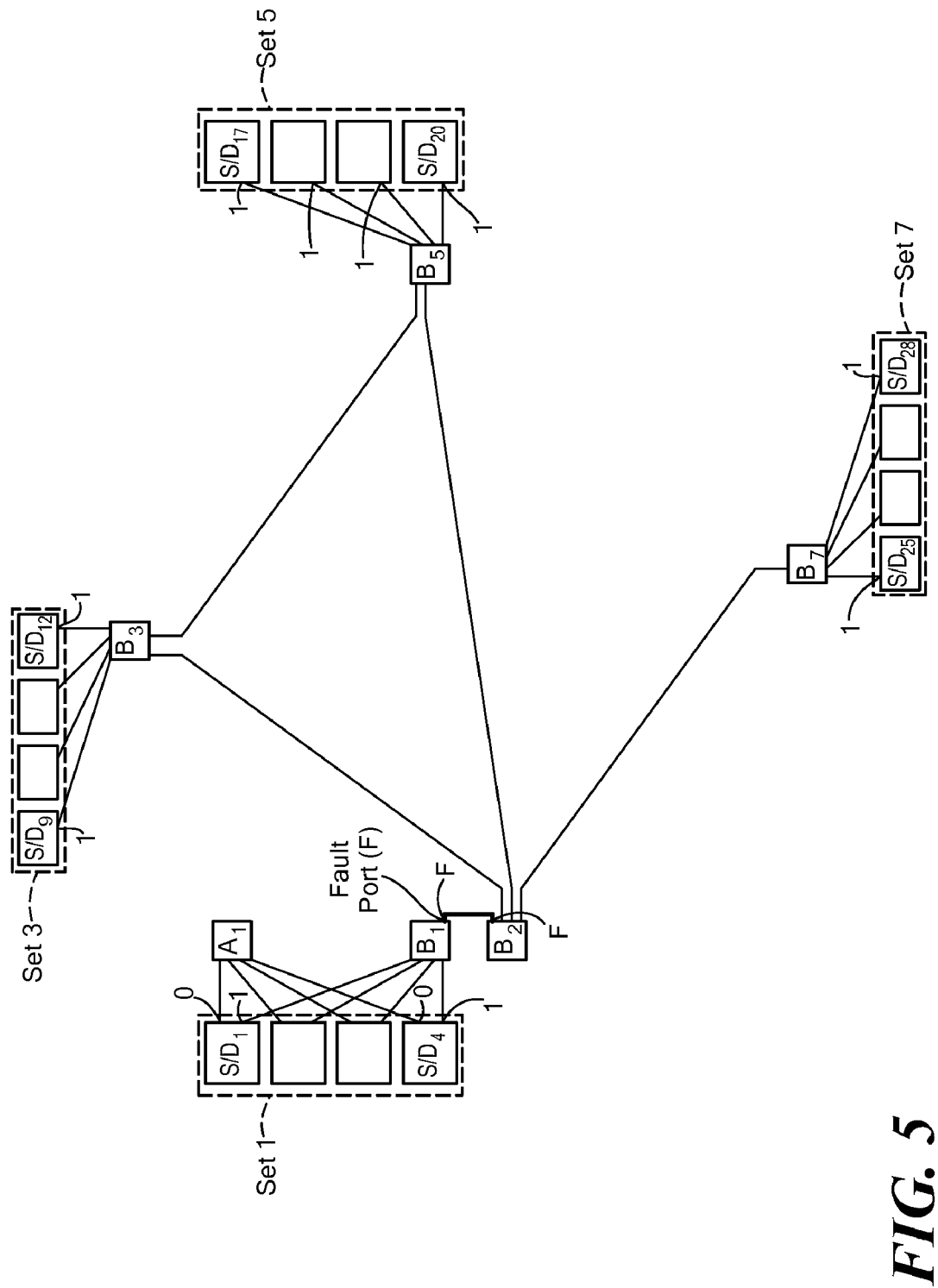
FIG. 5 is a diagram of a portion of the network of FIG. 1 showing interconnections in transmission for a packet when one of the nodes in the exemplary set of nodes of FIG. 4A is detected in accordance with the invention.

Thus, consider for example a node in SET 1 has detected a fault in the transmission via port 0 destined for SET 3,5,7 as illustrated in FIG. 4b. The node in SET 1 changes the transmission to the other port thereof, as described above, here, in this example to port 1. Thus, the packet passes to switch B1 rather than to A1, as shown in FIG. 5. Referring to FIG. 5, the switch B1 detects that the destination for the packet is in its normal routing table (Table 1 above). Thus, the packet is directed to a fault port (F) of switch B1, as shown in FIG. 5. The packet is now routed through the network B. The process is summarized by the flow diagram in FIG. 4A. Thus, the switch determines whether the packet it receives has a destination within its normal routing table, Table 1, SET 3,5,7. If so, the normal routing able is used by such switch. On the other hand, if the packet such switch receives is not in the normal routing table, the switch directs the packet to its default port (F) in according the fault table (Table 2), below:

TABLE 2

| FAULT TABLE ROUTING SWITCH A1 | |
|---|---|
| SET HAVING DESTINATION NODE IN | ROUTE TO SWITCH A2 VIA FAULT PORT (F) IN SWITCH A1 |
| SET 4 | |
| SET 6 | |
| SET 8 | |
| FAULT ROUTING TABLE SWITCH A2 | |
| SET HAVING DESTINATION NODE IN | ROUTE TO SWITCH IN SWITCH A1 VIA FAULT PORT (F) IN SWITCH A |
| SET 3 | |
| SET 5 | |
| SET 7 | |
| FAULT ROUTING TABLE SWITCH A3 | |
| SET HAVING DESTINATION NODE IN | ROUTE TO SWITCH A4 VIA FAULT PORT (F) IN SWITCH A3 |
| SET 2 | |
| SET 5 | |
| SET 7 | |
| FAULT ROUTING TABLE SWITCH A4 | |
| SET HAVING DESTINATION NODE IN | ROUTE TO SWITCH A3 VIA FAULT PORT (F) IN SWITCH A4 |
| SET 1 | |
| SET 6 | |
| SET 8 | |
| FAULT ROUTING TABLE SWITCH A5 | |
| SET HAVING DESTINATION NODE IN | ROUTE TO SWITCH A6 VIA FAULT PORT (F) IN SWITCH A5 |
| SET 3 | |
| SET 7 | |
| SET 8 | |
| FAULT ROUTING TABLE SWITCH A6 | |
| SET HAVING DESTINATION NODE IN | ROUTE TO SWITCH A5 VIA FAULT PORT (F) IN SWITCH A6 |
| SET 1 | |
| SET 4 | |
| SET 8 | |
| FAULT ROUTING TABLE SWITCH A7 | |
| SET HAVING DESTINATION NODE IN | ROUTE TO SWITCH A8 VIA FAULT PORT (F) IN SWITCH A7 |
| SET 2 | |
| SET 3 | |
| SET 5 | |

TABLE 2-continued

| FAULT ROUTING TABLE SWITCH A8 | |
| --- | --- |
| SET HAVING DESTINATION NODE IN | ROUTE TO SWITCH A7 VIA FAULT PORT (F) IN SWITCH A8 |
| SET 1 SET 4 SET 6 | |

| FAULT TABLE SWITCH B1 | |
| --- | --- |
| SET HAVING DESTINATION NODE IN | ROUTE TO SWITCH B2 VIA FAULT PORT (F) IN SWITCH B1 |
| SET 3 SET 5 SET 7 | |

| FAULT ROUTING TABLE SWITCH B2 | |
| --- | --- |
| SET HAVING DESTINATION NODE IN | ROUTE TO SWITCH IN SWITCH B1 VIA FAULT PORT (F) IN SWITCH B2 |
| SET 4 SET 6 SET 8 | |

| FAULT ROUTING TABLE SWITCH B3 | |
| --- | --- |
| SET HAVING DESTINATION NODE IN | ROUTE TO SWITCH B4 VIA FAULT PORT (F) IN SWITCH B3 |
| SET 2 SET 6 SET 8 | |

| FAULT ROUTING TABLE SWITCH B4 | |
| --- | --- |
| SET HAVING DESTINATION NODE IN | ROUTE TO SWITCH B3 VIA FAULT PORT (F) IN SWITCH B4 |
| SET 2 SET 5 SET 7 | |

| FAULT ROUTING TABLE SWITCH B5 | |
| --- | --- |
| SET HAVING DESTINATION NODE IN | ROUTE TO SWITCH B6 VIA FAULT PORT (F) IN SWITCH B5 |
| SET 1 SET 4 SET 8 | |

| FAULT ROUTING TABLE SWITCH B6 | |
| --- | --- |
| SET HAVING DESTINATION NODE IN | ROUTE TO SWITCH B5 VIA FAULT PORT (F) IN SWITCH B6 |
| SET 2 SET 3 SET 7 | |

| FAULT ROUTING TABLE SWITCH B7 | |
| --- | --- |
| SET HAVING DESTINATION NODE IN | ROUTE TO SWITCH B8 VIA FAULT PORT (F) IN SWITCH B7 |
| SET 1 SET 4 SET 6 | |

TABLE 2-continued

| FAULT ROUTING TABLE SWITCH B8 | |
| --- | --- |
| SET HAVING DESTINATION NODE IN | ROUTE TO SWITCH B7 VIA FAULT PORT (F) IN SWITCH B8 |
| SET 1 SET 4 SET 6 | |

It should be understated that a fault table need not list the destinations which are absent from the normal table (Table 1), but rather the switch may merely detect the absence of the destination from the normal table (Table 1) and thereby direct the packet to the fault port (F). In such case, the fault table may take the form of circuitry that, upon detection of the absence of the destination for the normal table directs the packet to the default port (F). Such circuitry is herein considered as equivalent to a fault table.

Figure 6:
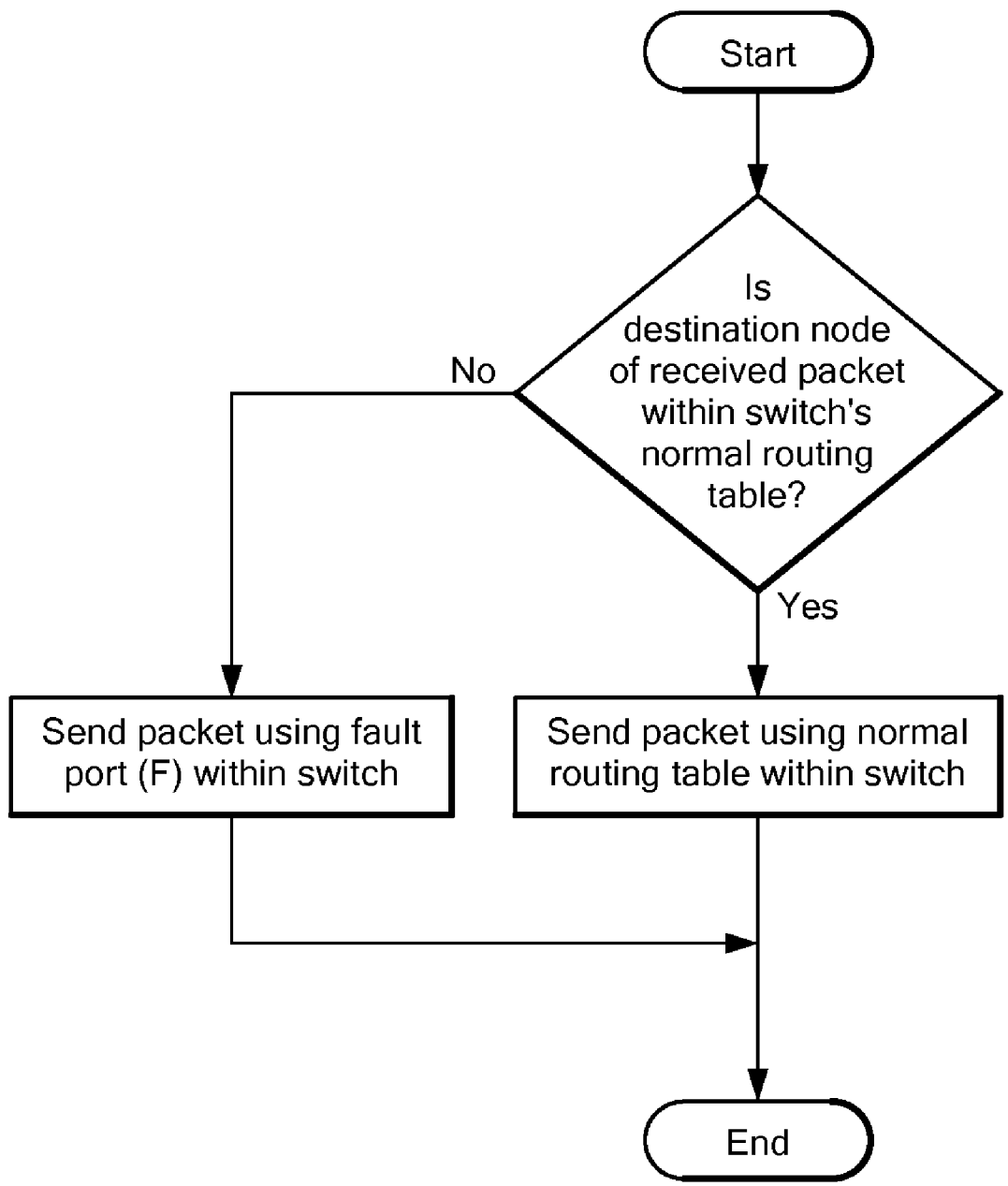
FIG. 6 is a flow diagram of a process used by an exemplary of the switches in the network of FIG. 1.

The process described above in connection with the flow diagram of FIG. 6 may be represented by the following SWITCH EQUATION:

SWITCH EQUATION

IF (there is a matching entry for that address the packet)
 The packet is sent to the corresponding output port.

ELSE
 The packet is sent to a special output called the 'fault output' or fault port (F).

It is first noted that when the packet is re-routed because of detection of a fault, the packet passes through three switches in passing from the source node to the destination nodes, as shown in FIG. 5.

Thus, referring again to FIG. 1, the network of switches (i.e., network 10) is constructed such that 'fault ports' (i.e., fault ports (F)) are connected directly together, and there is an A network, and a B network. Every node is connected to every other node through either the A network, OR the B network, thus bi-furcated. If a packet fails to generate an ACK, then the node equation will send the packet to the other network. The FIRST switch on that network will send the packet to the 'fault port' of another switch on the same network (A or B), and that switches routing table will be programmed for that receiver packet.

A number of embodiments of the invention have been described. Nevertheless, it will be understood that various modifications may be made without departing from the spirit and scope of the invention. Accordingly, other embodiments are within the scope of the following claims.

What is claimed is:

1. A switching network, comprising:
 a plurality of sets of nodes;
 a network having:
  a plurality of pairs of switches, each one of the pairs of switches being coupled to a corresponding one of the sets of nodes, each one of the switches having a plurality of ports, one of such ports being a predetermined designated fault port;
  links interconnecting the ports of the plurality of switches;
  wherein the designated fault port of a first one of the switches in a first one of the pair of switches is coupled by a first one of the links to the designated fault port of a first one of the switches in a second one of the pair of switches and wherein the designated fault port of a second one of the switches in the first one of the pair of switches is coupled by a second one of the links to the designated fault port of a second one of the switches in the second one of the pair of switches; and wherein each one of the switches has a normal routing table and a fault routing table for routing packets from a source one of the nodes to a destination one of the nodes through the network according to the normal routing table and, upon such source one of the nodes detecting a fault in transmission of such packet, routing such packet to the predetermined designated fault port of such switch according to the fault routing table.

2. The network recited in claim 1 one of the first one of the links and the second one of the links transmit packets in the presence or absence of detection of a fault.

3. A switching network, comprising:

a plurality of nodes;

a network having:

a plurality of switches coupled to the nodes, each one of the switches having a plurality of ports, one of such ports being a predetermined designated fault port; and links interconnecting the ports of the plurality of switches; and wherein each one of the switches has a normal routing table for routing packets from a source one of the nodes to a destination one of the nodes through the network according to the normal routing table and, upon such source one of the nodes detecting a fault in transmission of such packet, routing such packet to the predetermined designated fault port of such switch;

and wherein:

a first portion of the plurality of switches is interconnected through a first portion of the links to provide a first portion of the network and a second portion of the plurality of switches is interconnected through a second portion of the links to provide a second portion of the network;

the plurality of nodes are arranged in sets, each one of the nodes having a pair of ports;

each one of the sets of nodes is coupled to a corresponding one of the first portion of the switches and to a corresponding one of the second portion of the switches;

a first one of the pair of ports in each one of the sets of nodes being connected to the corresponding one of the switches of the first portion of switches and a second one of the pair of ports in each one of the sets nodes being connected to the corresponding one of the switches of the second portion of switches; and wherein the designated fault port of a first one of the switches in a first one of the pair of switches is coupled by a first one of the links to the designated fault port of a first one of the switches in a second one of the pair of switches and wherein the designated fault port of a second one of the switches in the first one of the pair of switches is coupled by a second one of the links to the designated fault port of a second one of the switches in the second one of the pair of switches.

4. The network recited in claim 3 wherein each one of the nodes directs the packet to the first one of the pair of ports thereof providing a most direct route to the destination one of the nodes.

5. The network recited in claim 4 wherein each one of the nodes directs the packet to the second one of the pair of ports thereof upon such one of the nodes detecting a fault in the transmission of such packet to the destination one of the nodes.

6. A switching network, comprising;

a plurality of sets of nodes;

a plurality of pairs of switches, each of the pairs of switches being coupled to a corresponding one of the sets of nodes;

wherein each one of the switches has a plurality of ports, one of such ports being connected to another one of the switches, one of the plurality of ports of each one of the switches being a predetermined designated fault port, each;

wherein the designated fault port of one of the switches in the pair is interconnected to the designated fault port of another one of the pair of switches;

one of the switches in each one of the pairs thereof being coupled to a corresponding one of the switches in the pairs of switches in one portion of other ones of the pairs of switches and the other one of the switches in each one of the pairs thereof being coupled to a corresponding one of the switches in the pairs of switches in a different portion of the other ones of the pairs of switches;

wherein each one of the switches has a normal routing table for routing data from one of the nodes connected to such one of the switches to another one of the nodes during a normal operating mode and for routing data from one of the nodes connected to such one of the switches to the corresponding one of the switches in another of the pairs of switches coupled thereto through the predetermined designated fault ports of the switches in a pair of the switches having the interconnected fault ports upon detection of a fault routing data through during the normal operating mode; and wherein the designated fault port of a first one of the switches in a first one of the pair of switches is coupled by a first one of the links to the designated fault port of a first one of the switches in a second one of the pair of switches and wherein the designated fault port of a second one of the switches in the first one of the pair of switches is coupled by a second one of the links to the designated fault port of a second one of the switches in the second one of the pair of switches.

7. The switching network recited in claim 6 wherein each one of the switches has a normal routing table and a fault routing table for routing packets from a source one of the nodes to a destination one of the nodes through the network according to the normal routing table and, upon such source one of the nodes detecting a fault in transmission of such packet, routing such packet to the predetermined designated fault port of such switch according to the fault routing table.

8. A switching network, comprising:

a plurality of nodes;

a network having:

a plurality of switches coupled to the nodes, each one of the switches having a plurality of normal routing ports and a predetermined designated fault port; and links interconnecting ports of the plurality of switches; and wherein each one of the switches has a normal routing table and a fault routing table for routing packets from a source one of the nodes to a destination one of the nodes through the normal routing ports according to the normal routing table and, upon such source one of the nodes detecting a fault in transmission of one of such packets, routing such one of the packets through the predetermined designated fault port of one of the switches coupled to such source one of the nodes according to the fault routing table; and wherein the designated fault port of a first one of the switches in a first one of the pair of switches is coupled by a first one of the links to the designated fault port of a first one of the switches in a second one of the pair of switches and wherein the designated fault port of a second one of the switches in the first one of the pair of switches is coupled by a second one of the links to the designated fault port of a second one of the switches in the second one of the pair of switches.

9. A switching network, comprising;

a plurality of sets of nodes;

a plurality of pairs of switches, each one of the pairs of switches being coupled to a corresponding one of the sets of nodes;

wherein each one of the switches has a plurality of ports, one of such ports being connected to another one of the switches, one of the plurality of ports of each one of the switches being a predetermined designated fault port;

wherein the designated fault port of a first one of the switches in a first one of the pair of switches is coupled by a first one of the links to the designated fault port of a first one of the switches in a second one of the pair of switches and wherein the designated fault port of a second one of the switches in the first one of the pair of switches is coupled by a second one of the links to the designated fault port of a second one of the switches in the second one of the pair of switches; and wherein each one of the switches has a normal routing table for routing data from one of the nodes connected to such one of the switches to another one of the nodes during a normal operating mode and for routing data from one of the nodes connected to such one of the switches to the corresponding one of the switches in another of the pairs of switches coupled thereto through the predetermined designated fault ports of the switches in a pair of the switches having the interconnected fault ports upon detection of a fault routing data through during the normal operating mode.

10. The network recited in claim 9 wherein one of the switches in each one of the pairs thereof is coupled to a corresponding one of the switches in the pairs of switches in one portion of other ones of the pairs of switches and the other one of the switches in each one of the pairs thereof is coupled to a corresponding one of the switches in the pairs of switches in a different portion of the other ones of the pairs of switches.

11. A switching network, comprising;

a plurality of sets of nodes;

a plurality of pairs of switches, each one of the pairs of switches being coupled to a corresponding one of the sets of nodes;

wherein each one of the switches has a plurality of ports, one of such ports being a predetermined designated fault port, wherein the designated fault port of a first one of the switches in a first one of the pair of switches is coupled by a first one of the links to the designated fault port of a first one of the switches in a second one of the pair of switches and wherein the designated fault port of a second one of the switches in the first one of the pair of switches is coupled by a second one of the links to the designated fault port of a second one of the switches in the second one of the pair of switches.

12. The switching network recited in claim 11 wherein each one of the switches has a normal routing table for routing data from one of the nodes connected to such one of the switches to another one of the nodes during a normal operating mode and for routing data from one of the nodes connected to such one of the switches to the corresponding one of the switches in another of the pairs of switches coupled thereto through the predetermined designated fault ports of the switches in a pair of the switches having the interconnected fault ports upon detection of a fault routing data through during the normal operating mode.

* * * * *